W. L. PAUL.
ENGINE GANG PLOW.
APPLICATION FILED JUNE 11, 1910.
984,293.
Patented Feb. 14, 1911.
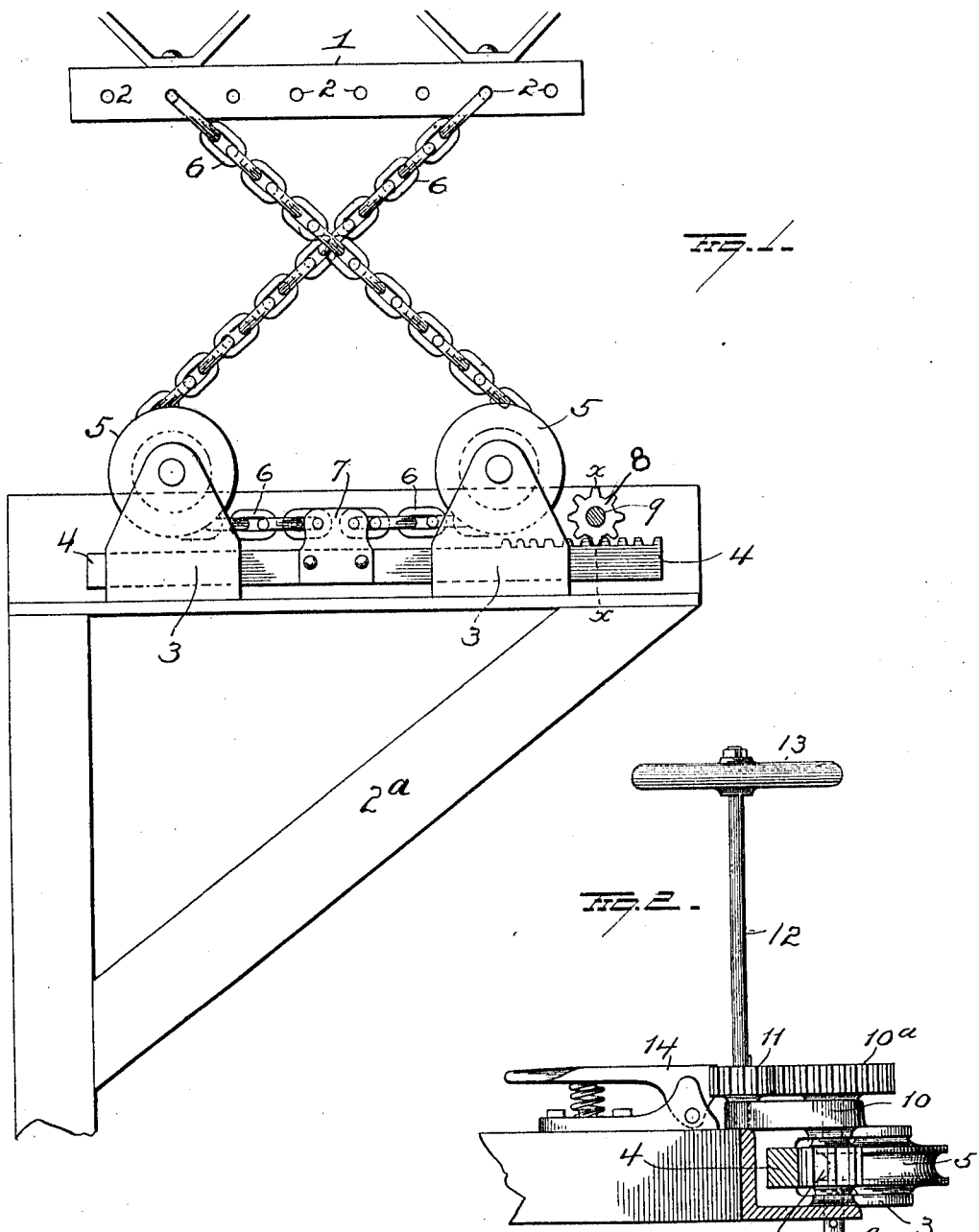

UNITED STATES PATENT OFFICE.

WILLIAM L. PAUL, OF SOUTH BEND, INDIANA, ASSIGNOR TO OLIVER CHILLED PLOW WORKS, OF SOUTH BEND, INDIANA.

ENGINE GANG-PLOW.

984,293.  Specification of Letters Patent.  Patented Feb. 14, 1911.

Application filed June 11, 1910. Serial No. 566,416.

*To all whom it may concern:*

Be it known that I, WILLIAM L. PAUL, of South Bend, in the county of St. Joseph and State of Indiana, have invented certain new and useful Improvements in Engine Gang-Plows; and I do hereby declare the following to be a full, clear, and exact description of the invention, such as will enable others skilled in the art to which it appertains to make and use the same.

This invention relates to improvements in engine gang plows and more particularly to means for guiding the plow gang.

In the operation of engine gang plows, it becomes desirable at times to make a quick shift so that the plow gang may keep its proper position regardless of the variation in the travel of the engine. Also in turning a corner, there are times when it is desired to swing the plow gang to the right because of the inability of the engine to sufficiently approach the corner.

The object of my present invention is to provide means under the control of the operator for guiding the plow gang in accomplishing the purposes above specified.

With this object in view the invention consists in certain novel features of construction and combinations of parts as hereinafter set forth and pointed out in the claims.

In the accompanying drawings, Figure 1 is a plan view of a portion of an engine gang plow structure showing the application of my invention, and Fig. 2 is a section on the line $x$—$x$ of Fig. 1 and showing certain additional features of construction omitted from Fig. 1.

1 represents the rear frame or bracket of a traction engine, having in its horizontal portion a series of holes 2 for the adjustable attachment of the ends of chains, and 2ª represents the truck or traveling member with which the plow beams are connected. Upon the forward end of the truck 2ª, brackets 3 are secured at suitable distances apart. A rack-bar 4 is mounted upon the truck 2ª and longitudinally movable on the same and through said brackets. Pulleys 5 are mounted in the brackets 3 and about these pulleys, chains 6 pass. The chains 6 are crossed as shown in Fig. 1 and attached at their forward ends to the rear frame or bracket 1 of the engine, while the rear ends of said chains are attached to an arm 7 rigidly secured to the rack-bar 4 at a point between the brackets 3. If desired, two chains 6 may be employed, as shown in Fig. 1, or a single chain, connected intermediate of its ends with the arm 7, may be used.

The rack-bar 4 receives motion from a pinion 8 carried by a shaft 9 mounted in a bracket 10 on the truck 2ª. While hand operating means may be connected directly with the shaft 9, still I prefer, in order to increase the leverage in applying power to the pinion 8 and the rack-bar 4 to adjust the position of the plow gang, to employ the devices now to be described.

A gear 10ª is secured to the upper end of the shaft 9 and with this gear a pinion 11 meshes,—said pinion 11 being secured to the lower end of a vertical shaft 12 mounted in the bracket 10 and provided at its upper end with a hand wheel 13.

It will be readily seen that by operating the hand wheel 13, motion will be transmitted through the gearing above described, to the longitudinally movable rack-bar 4 and therefore to the crossed chains 6 to shift the truck 2 and plow gang connected therewith laterally for the purpose of keeping the plow gang in proper position regardless of variation of travel of the engine, or to cause the plow gang to work close to the corner to be turned when the engine cannot closely approach such corner.

In order to normally retain the truck and plow gang in proper position, the hand operating mechanism above described will be locked by the engagement of a spring pressed foot latch 14 mounted on the truck, with the pinion 11 as clearly shown in Fig. 2.

Having fully described my invention what I claim as new and desire to secure by Letters-Patent, is,—

1. In an engine gang plow structure, the combination of a plow carrying truck, an engine, a slidable member disposed transversely of the line of draft, means connecting said truck and engine and connected with said slidable member, and means for moving said slidable member to adjust and guide the truck and plows laterally with respect to the engine.

2. In an engine gang plow structure, the combination with the engine, a plow carrying truck and flexible devices connecting said truck with the engine, of a longitudinally movable member mounted on the truck so as to move transversely of the latter and connected with said flexible devices for guiding said plow carrying truck.

3. In an engine gang plow structure, the combination with the engine, a plow carrying truck and flexible devices connecting said truck with the engine, of a longitudinally movable member mounted transversely of the truck and connected with said flexible devices, and manually operated means mounted on the truck and connected with said longitudinally movable member for guiding the truck and the plow gang carried thereby.

4. In an engine gang plow structure, the combination of the engine, a plow carrying truck, flexible means connected with the engine and the truck, a longitudinally movable bar on the truck and connected with the flexible devices, manually operated means mounted on the truck and connected with said longitudinally movable bar for moving the latter to guide the truck and the plow gang connected therewith, and means for locking said manually operated means.

5. In an engine gang plow structure, the combination with the engine, a plow carrying truck and pulleys mounted on said truck, of flexible means connected with the engine and passing about said pulleys, a longitudinally movable bar connected with said flexible means, and manually operated means for moving said bar longitudinally.

6. In an engine gang plow structure, the combination with the engine, a plow carrying truck and pulleys mounted on said truck, of flexible means connected with the engine and passing about said pulleys, a longitudinally movable bar connected with said flexible means, manually operated means for moving said bar longitudinally, and means for locking the manually operated means.

7. In an engine gang plow structure, the combination with the engine and a plow carrying truck, of pulleys mounted on the truck, crossed chains connected with the engine and passing about said pulleys, a longitudinally movable bar mounted on the truck and connected with said chains, and manually operated means for moving said bar longitudinally.

8. In an engine gang plow structure, the combination with the engine and a plow carrying truck, of pulleys mounted on said truck, a longitudinally movable rack-bar mounted on the truck, crossed-chains connected with the engine, passing about said pulleys and connected with said rack-bar between the pulleys, a pinion meshing with said rack-bar, and manually operated means for rotating said pinion.

9. In an engine gang plow structure, the combination with the engine and a plow carrying truck, of pulleys mounted on the truck, a rack-bar mounted on the truck, crossed chains connected with the engine, passing about said pulleys and connected with the rack-bar between the pulleys, a shaft, a pinion carried by said shaft and meshing with the rack-bar, a gear wheel carried by said shaft, a hand operated shaft, a pinion carried by the last mentioned shaft and meshing with the gear wheel, and a latch to engage the last mentioned pinion.

In testimony whereof, I have signed this specification in the presence of two subscribing witnesses.

WILLIAM L. PAUL.

Witnesses:
 EDWIN NICAR,
 THOS. A. FREEMAN.